United States Patent
Dindar et al.

(10) Patent No.: US 9,995,245 B2
(45) Date of Patent: Jun. 12, 2018

(54) VARIABLE IMMERSION LOBE MIXER FOR TURBOFAN JET ENGINE EXHAUST AND METHOD OF FABRICATING THE SAME

(71) Applicant: GENERAL ELECTRIC COMPANY, Schenectady, NY (US)

(72) Inventors: Mustafa Dindar, Cincinnati, OH (US); Vaughn Ray Kunze, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 691 days.

(21) Appl. No.: 14/396,800

(22) PCT Filed: Apr. 26, 2013

(86) PCT No.: PCT/US2013/038332
§ 371 (c)(1),
(2) Date: Oct. 24, 2014

(87) PCT Pub. No.: WO2014/007907
PCT Pub. Date: Jan. 9, 2014

(65) Prior Publication Data
US 2015/0107225 A1    Apr. 23, 2015

Related U.S. Application Data

(60) Provisional application No. 61/639,677, filed on Apr. 27, 2012.

(51) Int. Cl.
*F02K 1/38* (2006.01)
*F02K 1/46* (2006.01)
(Continued)

(52) U.S. Cl.
CPC .............. *F02K 1/386* (2013.01); *B64D 33/06* (2013.01); *F02K 1/46* (2013.01); *F02K 1/48* (2013.01);
(Continued)

(58) Field of Classification Search
CPC ... F02K 1/38; F02K 1/386; F02K 1/46; F02K 1/48; F02K 1/827; B64D 33/06;
(Continued)

(56) References Cited

U.S. PATENT DOCUMENTS

| 3,053,340 A | 9/1962 | Kutney |
| 4,066,214 A | 1/1978 | Johnson |

(Continued)

FOREIGN PATENT DOCUMENTS

| DE | 19909792 A1 | 9/2000 |
| EP | 2383455 A2 | 11/2011 |

(Continued)

OTHER PUBLICATIONS

Unofficial English Translation of Japanese Office Action issued in connection with corresponding JP Application No. 2015-509166 dated Dec. 1, 2015.

(Continued)

*Primary Examiner* — Gerald L Sung
*Assistant Examiner* — Scott Walthour
(74) *Attorney, Agent, or Firm* — General Electric Company; Brian P. Overbeck

(57) ABSTRACT

A method of fabricating a mixer for a gas turbine engine is provided. The method includes forming a forward end and an aft end of the mixer, and forming an annularly undulating contour that defines a plurality of core immersion lobes and a plurality of bypass immersion lobes between the forward end and the aft end. The plurality of bypass immersion lobes includes a first bypass immersion lobe and a second bypass (Continued)

immersion lobe. The first bypass immersion lobe has a first crown contour line extending from the forward end to the aft end of the mixer, and the second bypass immersion lobe has a second crown contour line extending from the forward end to the aft end of the mixer. The first crown contour line is different than the second crown contour line.

17 Claims, 7 Drawing Sheets

(51) Int. Cl.
*F02K 1/34* (2006.01)
*F02K 1/48* (2006.01)
*B64D 33/04* (2006.01)
*F02K 1/82* (2006.01)

(52) U.S. Cl.
CPC .......... *B64D 2033/045* (2013.01); *F02K 1/38* (2013.01); *F02K 1/827* (2013.01); *F05D 2230/20* (2013.01); *F05D 2230/60* (2013.01); *F05D 2250/184* (2013.01); *F05D 2250/61* (2013.01); *F05D 2250/611* (2013.01); *F05D 2250/70* (2013.01); *F05D 2250/71* (2013.01); *F05D 2260/96* (2013.01); *F05D 2300/6033* (2013.01); *Y02T 50/672* (2013.01); *Y10T 29/49234* (2015.01)

(58) Field of Classification Search
CPC .......... B64D 2033/045; F05D 2250/61; F05D 2250/62; F05D 2260/96
See application file for complete search history.

(56) References Cited

U.S. PATENT DOCUMENTS

| | | |
|---|---|---|
| 4,401,269 A | 8/1983 | Eiler |
| 4,548,034 A | 10/1985 | Magire |
| 4,566,270 A | 1/1986 | Ballard et al. |
| 4,813,230 A * | 3/1989 | Braithwaite ............ F02K 1/386 181/220 |
| 5,117,628 A * | 6/1992 | Koshoffer ............... F02K 1/386 60/226.1 |
| 5,638,675 A * | 6/1997 | Zysman .................. F02K 1/386 181/220 |
| 5,884,472 A | 3/1999 | Presz, Jr. et al. |
| 6,412,283 B1 | 7/2002 | Sheoran et al. |
| 6,578,355 B1 | 6/2003 | Mundt |
| 6,804,948 B2 | 10/2004 | Oishi |
| 7,017,332 B2 | 3/2006 | Oishi |
| 7,434,384 B2 | 10/2008 | Lord et al. |
| 8,584,356 B2 | 11/2013 | Philippe et al. |
| 2004/0006968 A1* | 1/2004 | Oishi ...................... F02K 1/386 60/262 |
| 2008/0190096 A1 | 8/2008 | Lord et al. |
| 2010/0126183 A1 | 5/2010 | Conete et al. |

FOREIGN PATENT DOCUMENTS

| | | |
|---|---|---|
| GB | 2119859 A | 11/1983 |
| JP | S58-085345 A | 5/1983 |
| JP | S61-004849 A | 1/1986 |
| JP | 09170453 A | 6/1997 |
| JP | 11173213 A | 6/1999 |
| JP | 2002317698 A | 10/2002 |
| JP | 2010518313 A | 5/2010 |

OTHER PUBLICATIONS

Unofficial English Translation of Japanese Office Action issued in connection with corresponding JP Application No. 2015509166 dated Jun. 28, 2016.

International Search Report and Written Opinion dated Feb. 25, 2014 which was issued in connection with PCT Patent Application No. US13/38332 which was filed on Apr. 26, 2013.

Unofficial English Translation of Chinese Office Action issued in connection with corresponding CN Application No. 201380021820.2 dated Nov. 3, 2015.

Japanese Search Report issued in connection with corresponding JP Application No. 2015-509166 dated Oct. 15, 2016.

* cited by examiner

VARIABLE IMMERSION LOBE MIXER FOR TURBOFAN JET ENGINE EXHAUST AND METHOD OF FABRICATING THE SAME

CROSS-REFERENCE TO RELATED APPLICATIONS

This application claims the benefit of U.S. Provisional Patent Application No. 61/639,677, which was filed on Apr. 27, 2012 and is incorporated by reference herein in its entirety.

BACKGROUND OF THE INVENTION

The field of this disclosure relates generally to mixers and, more particularly, to mixers for gas turbine engine exhaust systems.

Many known gas turbine engines include a fan system, a core system, and an exhaust system arranged in axial flow communication with one another. The fan system provides a flow of air to the core system (a "core flow") and a flow of air to a bypass duct surrounding the core system (a "bypass flow"). Upon exiting the core system and the bypass duct, respectively, the core flow and the bypass flow are directed into the exhaust system for discharge into the ambient.

At least some known gas turbine engines utilize a mixer to better mix the core flow with the bypass flow in the exhaust system in order to facilitate improving overall engine performance. However, pressure losses within the exhaust system have been known to be associated with the use of at least some mixers, and these pressure losses can diminish the performance benefits associated with mixing. It would be useful, therefore, to have a mixer that facilitates mixing core and bypass flows within an exhaust system of a gas turbine engine while minimizing the pressure losses associated with such mixing.

BRIEF DESCRIPTION OF THE INVENTION

In one aspect, a method of fabricating a mixer for a gas turbine engine having a core system for directing a core flow of gas through the gas turbine engine, and a bypass duct external to the core system for directing a bypass flow of gas through the gas turbine engine is provided. The method includes forming a forward end and an aft end of the mixer, and forming an annularly undulating contour that defines a plurality of core immersion lobes and a plurality of bypass immersion lobes between the forward end and the aft end. The plurality of bypass immersion lobes includes a first bypass immersion lobe and a second bypass immersion lobe. The first bypass immersion lobe has a first crown contour line extending from the forward end to the aft end of the mixer, and the second bypass immersion lobe has a second crown contour line extending from the forward end to the aft end of the mixer. The first crown contour line is different than the second crown contour line.

In another aspect, a mixer for a gas turbine engine having a core system for directing a core flow of gas through the gas turbine engine, and a bypass duct external to the core system for directing a bypass flow of gas through the gas turbine engine is provided. The mixer includes a forward end, an aft end, and an annularly undulating contour defining a plurality of core immersion lobes and a plurality of bypass immersion lobes between the forward end and the aft end. The plurality of bypass immersion lobes includes a first bypass immersion lobe and a second bypass immersion lobe. The first bypass immersion lobe has a first crown contour line extending from the forward end to the aft end of the mixer, and the second bypass immersion lobe has a second crown contour line extending from the forward end to the aft end of the mixer. The first crown contour line is different than the second crown contour line.

In another aspect, a gas turbine engine is provided. The gas turbine engine includes a core system having a compressor assembly, a combustion assembly aft of the compressor assembly, and a turbine assembly aft of the combustion assembly. The compressor assembly, the combustion assembly, and the turbine assembly are arranged in flow communication along an axial dimension of the gas turbine engine. The gas turbine engine further includes a bypass duct extending along the axial dimension external to the core system, and a fan system forward of the compressor assembly and the bypass duct. The fan system is configured to provide a core flow of gas into the core system and a bypass flow of gas into the bypass duct. The gas turbine engine also includes an exhaust system aft of the core system and the bypass duct, and the exhaust system includes a tailpipe configured to receive the core flow and the bypass flow, and a mixer coupled to the core system aft of the turbine assembly within the tailpipe to define a bypass flow region of the tailpipe and a core flow region of the tailpipe. The mixer has a forward end, an aft end, and an annularly undulating contour defining a plurality of core immersion lobes and a plurality of bypass immersion lobes between the forward end and the aft end. The core immersion lobes are configured to deliver bypass flow into the core flow region of the tailpipe, and the bypass immersion lobes are configured to deliver core flow into the bypass flow region of the tailpipe. The plurality of bypass immersion lobes includes a first bypass immersion lobe and a second bypass immersion lobe. The first bypass immersion lobe has a first crown contour line extending from the forward end to the aft end of the mixer, and the second bypass immersion lobe has a second crown contour line extending from the forward end to the aft end of the mixer. The first crown contour line is different than said second crown contour line.

DETAILED DESCRIPTION OF THE INVENTION

The following detailed description sets forth a mixer and a method of fabricating the same by way of example and not by way of limitation. The description should clearly enable one of ordinary skill in the art to make and use the mixer, and the description sets forth several embodiments, adaptations, variations, alternatives, and uses of the mixer, including what is presently believed to be the best mode thereof The mixer is described herein as being applied to a preferred embodiment, namely an exhaust system for a gas turbine engine. However, it is contemplated that the mixer and the method of fabricating the mixer may have general application in a broad range of systems and/or a variety of commercial, industrial, and/or consumer applications other than exhaust systems for gas turbine engines.

Figure 1:
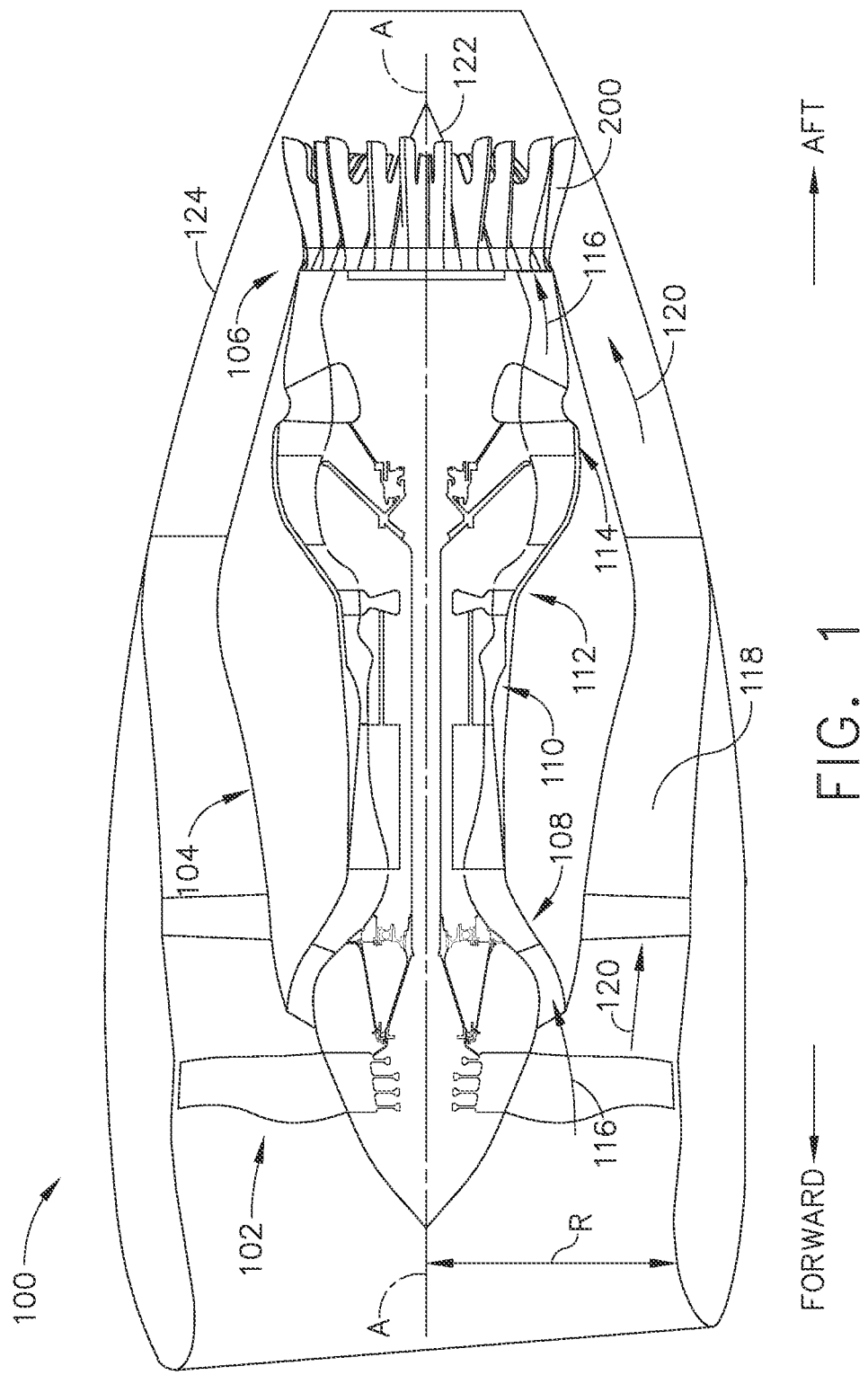
FIG. 1 is a schematic representation of a gas turbine engine.

FIG. 1 is a schematic illustration of an exemplary gas turbine engine 100 having an axial dimension A and a radial dimension R. Gas turbine engine 100 includes a fan system 102, a core system 104, and an exhaust system 106 arranged in axial flow communication with one another. Core system 104 includes a compressor assembly 108, a combustion assembly 110, a high pressure turbine assembly 112, and a low pressure turbine assembly 114. During operation, fan system 102 directs a first flow of air into core system 104 (a "core flow" 116) and a second flow of air into a bypass duct 118 external to core system 104 (a "bypass flow" 120).

Core flow 116 is directed into compressor assembly 108, in which core flow 116 is compressed and is then directed into combustion assembly 110. Within combustion assembly 110, core flow 116 is mixed with fuel and ignited to generate combustion gases, and core flow 116 is subsequently directed through high pressure turbine assembly 112 and low pressure turbine assembly 114. Core flow 116 exits low pressure turbine assembly 114 and enters exhaust system 106, in which core flow 116 is mixed with bypass flow 120 via a mixer 200. In other embodiments, gas turbine engine 100 may include any suitable fan system, core system, and/or exhaust system configured in any suitable manner that facilitates enabling mixer 200 to function as described herein. As used herein, references to mixer 200 in terms of orientation within gas turbine engine 100 (e.g., references such as "aft," "forward," "axial," "radial," or any variation thereof) are intended to mean that mixer 200 is configured to be oriented in such a manner when mixer 200 is mounted within gas turbine engine 100 as described herein, and such references to orientation are not intended to limit the scope of this disclosure to only those mixers that are actually mounted within a gas turbine engine. Rather, this disclosure is intended to apply to mixers in general, whether mounted within a gas turbine engine or not.

FIGS. 2-7 are perspective and back elevation views of various embodiments of mixer 200. Mixer 200 is configured to be coupled to core system 104 about an exhaust cone 122 and within a tailpipe 124 (shown schematically in FIGS. 1, 3, 5, 7) of exhaust system 106 to facilitate mixing bypass flow 120 from a radially outer, bypass flow region 128 of tailpipe 124 with core flow 116 from a radially inner, core flow region 126 of tailpipe 124. In the exemplary embodiment, mixer 200 is fabricated from a ceramic matrix composite (CMC) material and has an axially forward end 202 and an axially aft end 204, wherein axially forward end 202 may be suitably configured for coupling to core system 104 and wherein axially aft end 204 has a trailing edge 206. Mixer 200 has an annularly undulating contour that defines a plurality of bypass immersion lobes 208 and a plurality of core immersion lobes 210, wherein bypass immersion lobes 208 are configured to extend into bypass flow region 128 of tailpipe 124 and wherein core immersion lobes 210 are configured to extend into core flow region 126 of tailpipe 124. In this manner, bypass flow 120 is delivered into core flow region 126 via core immersion lobes 210, and core flow 116 is delivered into bypass flow region 128 via bypass immersion lobes 208, thereby better mixing bypass flow 120 and core flow 116 within tailpipe 124. Alternatively, mixer 200 may be fabricated from any suitable material.

Each bypass immersion lobe 208 has a crown contour line 212 extending from forward end 202 to aft end 204, and each core immersion lobe 210 has a base contour line 214 extending from forward end 202 to aft end 204. In some embodiments, the curvature (or change in radius along the axial dimension) of crown contour line 212 varies (i.e., is different) amongst at least two bypass immersion lobes 208 such that some bypass immersion lobes 208 have trailing edge peaks 218 that extend further into bypass flow region 128 of tailpipe 124 than trailing edge peaks 218 of other bypass immersion lobes 208 (e.g., the slope of a first bypass immersion lobe's crown contour line 212 as measured between a pair of axial locations is different than the slope of a second bypass immersion lobe's crown contour line 212 as measured between the same pair of axial locations). Similarly, in some embodiments, the curvature (or change in radius along the axial dimension) of base contour line 214 varies (i.e., is different) amongst at least two core immersion lobes 210 such that some core immersion lobes 210 have trailing edge valleys 216 that extend further into core flow region 126 of tailpipe 124 than trailing edge valleys 216 of other core immersion lobes 210 (e.g., the slope of a first core immersion lobe's base contour line 214 as measured between a pair of axial locations is different than the slope of a second core immersion lobe's base contour line 214 as measured between the same pair of axial locations). As such, the geometries of bypass immersion lobes 208 may be varied amongst one another, and/or the geometries of core immersion lobes 210 may be varied amongst one another to facilitate increased mixing, minimized pressure losses, and acoustic benefits associated therewith.

In some embodiments, bypass immersion lobes 208 and/or core immersion lobes 210 may be sized to be generally semi-elliptical in shape (e.g., U-shaped). For example, to optimize the variation in sizes amongst bypass immersion lobes 208 about mixer 200 in one embodiment, each lobe 208 is given a semi-major axis $A_{MJ}$ and a minor axis $A_{MN}$ at trailing edge 206, and each lobe 208 is sized by lengthening or shortening axes $A_{MJ}$, $A_{MN}$ substantially inversely proportionately to one another (e.g., as semi-major axis $A_{MJ}$ of a bypass immersion lobe 208 is lengthened and, therefore, trailing edge peak 218 of that bypass immersion lobe 208 is extended further into bypass flow region 128 to increase mixing, minor axis $A_{MN}$ of that bypass immersion lobe 208 is proportionately shortened to facilitate maintaining the desired flow area for that bypass immersion lobe 208, despite extending that bypass immersion lobe 208 further into bypass flow region 128 (the flow area of each lobe 208 being approximately $((\pi \cdot A_{MJ} \cdot (A_{MN} \div 2)) \div 2))$. By optimizing bypass immersion lobes 208 in this manner, some bypass immersion lobes 208 may be taller and thinner than other bypass immersion lobes 208, but the total flow area for all bypass immersion lobes 208 combined (i.e., the sum of the individual flow areas of all bypass immersion lobes 208, with each individual flow area being approximately $((\pi \cdot A_{MJ} \cdot (A_{MN} \div 2)) \div 2))$ remains substantially the same for the mixer 200, thereby minimizing pressure losses associated with improving the mixing. Notably, core immersion lobes 210 may be sized in a similar manner in some embodiments.

Additionally, mixing may be further optimized via scalloping (e.g., axially recessing) trailing edge sides 220 between trailing edge peaks 218 and trailing edge valleys 216 of at least one pair of adjacent lobes 208, 210 to increase the overall length of trailing edge 206 about mixer 200, thereby increasing the overall distance over which core flow 116 and bypass flow 120 may expand into one another. The scalloped trailing edge sides 220 also facilitate enabling better mixing between bypass flow 120 (i.e., colder gas) and core flow 116 (i.e., hotter gas) by optimizing the strength of the rotating regions (or vortices) at the interface between bypass flow 120 and core flow 116 aft of trailing edge 206. Because some bypass immersion lobes 208 extend further into bypass flow region 128 than other bypass immersion lobes 208 as set forth above, the radial positioning of the vortices varies about exhaust system 106 in accordance with the varying radial extension of bypass immersion lobes 208, which better energizes (or mixes) bypass flow 120 and core flow 116 and, therefore, results in a more uniform temperature throughout exhaust system 106. Furthermore, in other embodiments, lobes 208, 210 may be scarfed (i.e., trimmed at an angle that is oblique to axial dimension A). In alternative embodiments, lobes 208, 210 are not scalloped, and/or lobes 208, 210 are not scarfed. Thus, mixer 200 may be configured with varying lobe immersion about the circumference of mixer 200 to facilitate optimizing temperature mixing and pressure losses for gas turbine engine 100, yielding a net improvement in thrust and specific fuel consumption (SFC).

The above-described mixer embodiments facilitate improving exhaust system performance by reducing SFC via a reduction in overall pressure losses associated with the mixing of colder bypass flow and hotter core flow, while maintaining a higher level of mixing effectiveness. Varying lobe immersion about the mixer facilitates optimizing vortex placement, thereby resulting in a gain in overall SFC achieved by balancing enhanced mixing of higher immersion lobes with lower pressure losses of reduced immersion lobes. Additionally, better mixing may also result from the lobes generating vortices at different radii, thereby facilitating optimal placement of vortices within the tailpipe to facilitate ensuring that the entire exhaust profile is activated. By varying the radial extension of the lobes into bypass and/or core flow regions, as well as varying the perimeter of the mixer trailing edge, the intensity (magnitude) and the circumferential extent of the eddy flow can be optimized to facilitate controlling the amount of mixing.

Figure 2:
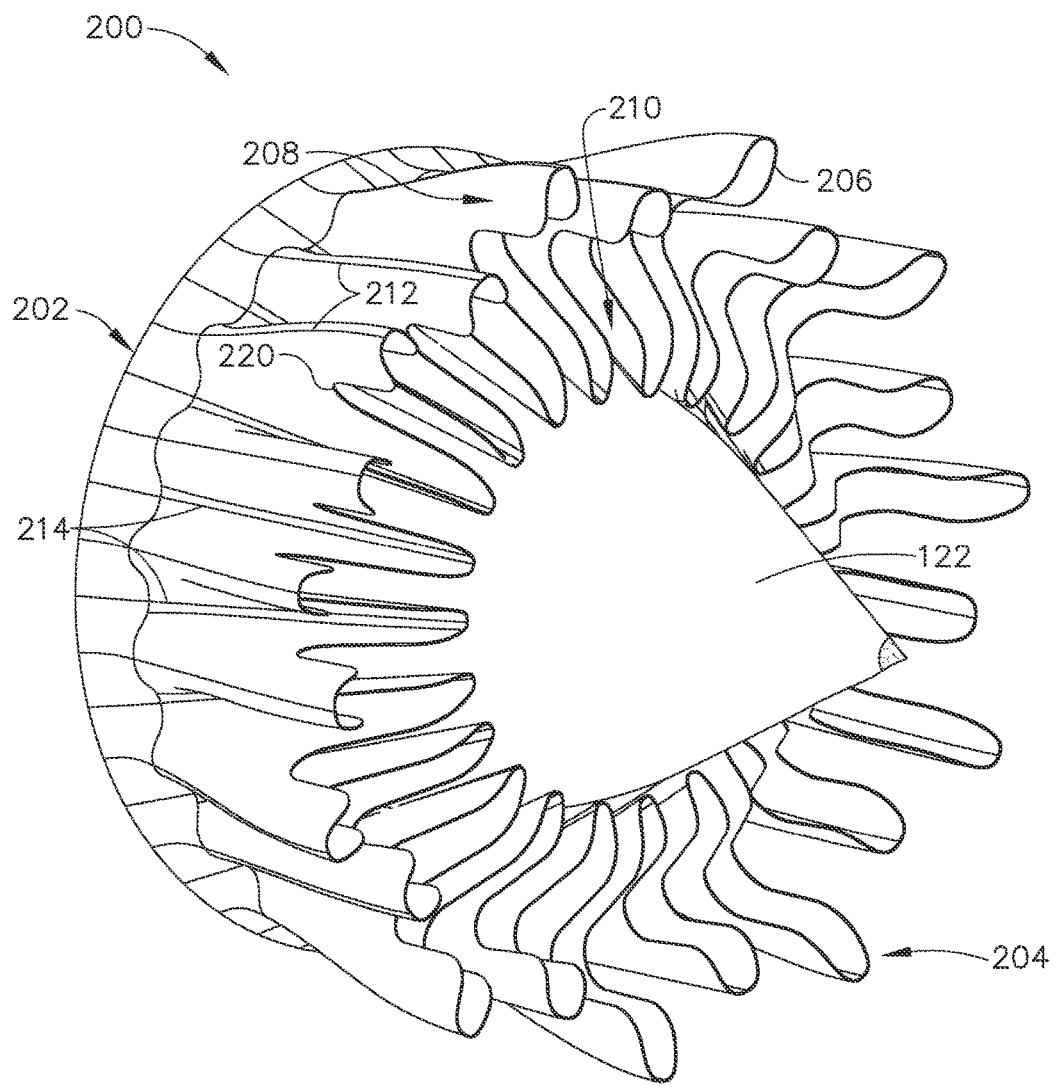
FIG. 2 is a perspective view of a first embodiment of a mixer for use on the gas turbine engine shown in FIG. 1.
Figure 3:
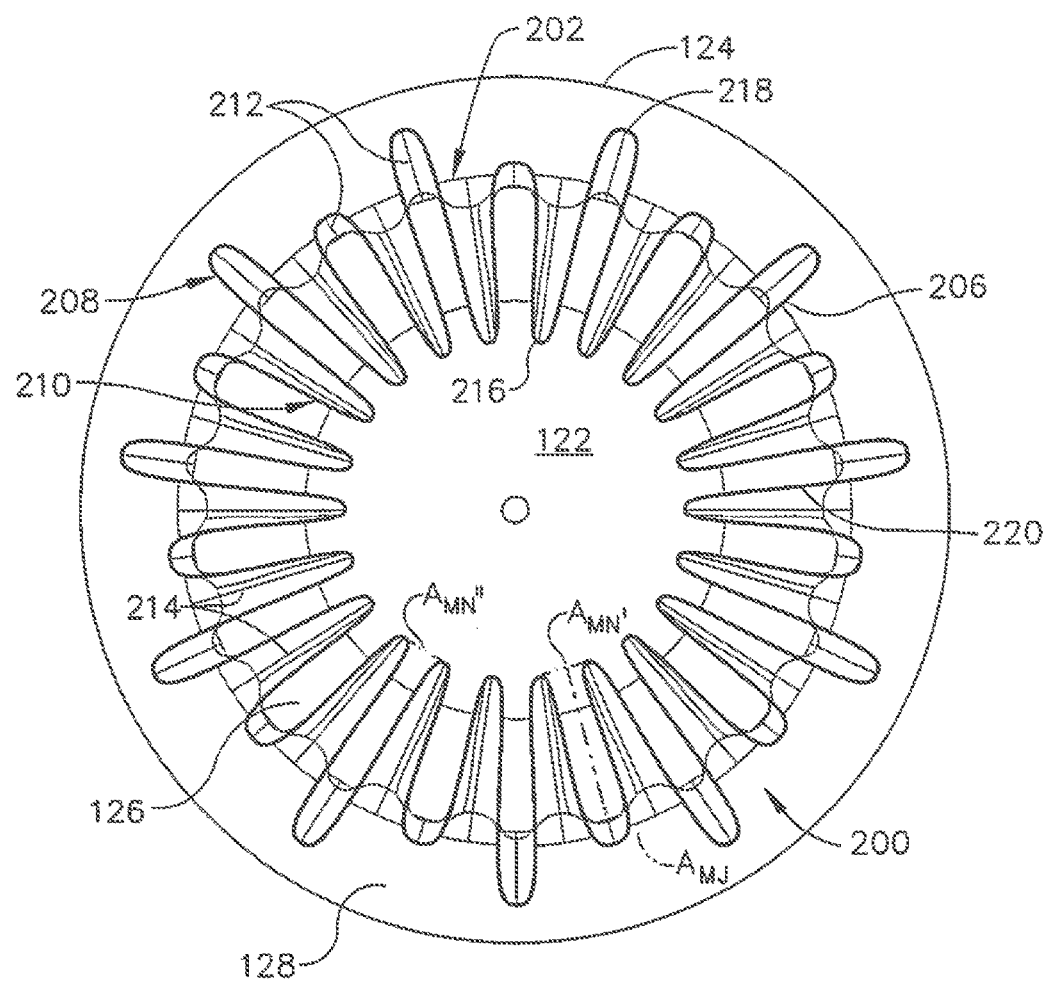
FIG. 3 is a back elevation view of the mixer shown in FIG. 2.
Figure 4:
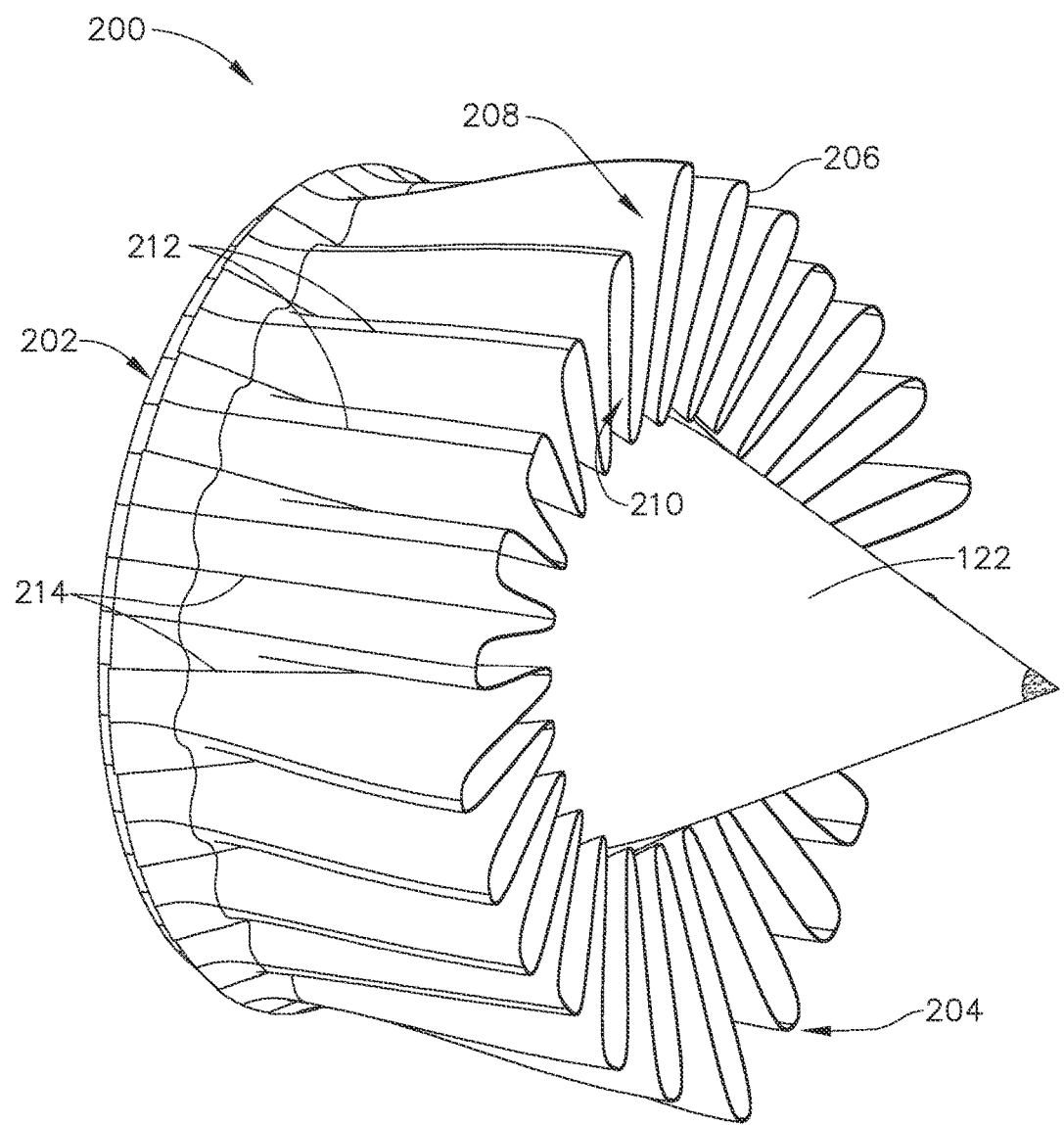
FIG. 4 is a perspective view of a second embodiment of a mixer for use on the gas turbine engine shown in FIG. 1.
Figure 5:
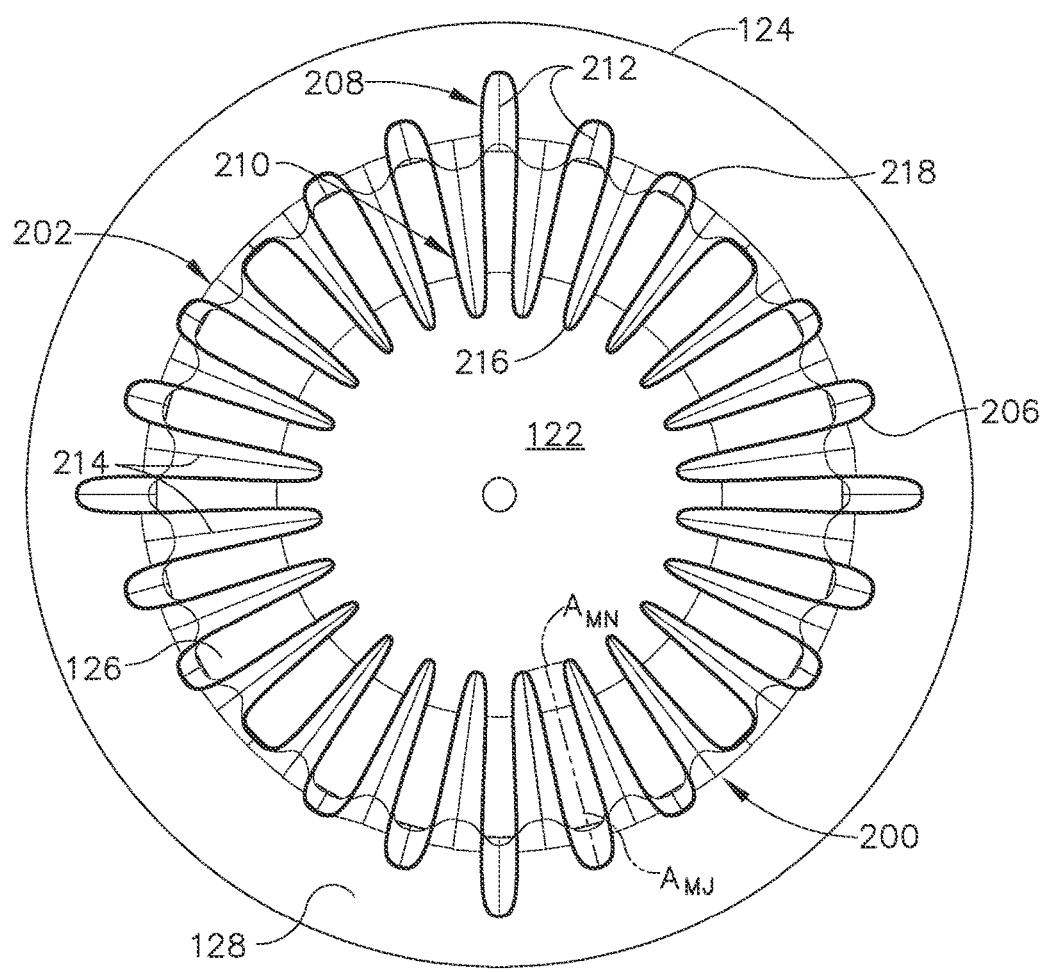
FIG. 5 is a back elevation view of the mixer shown in FIG. 4.
Figure 6:
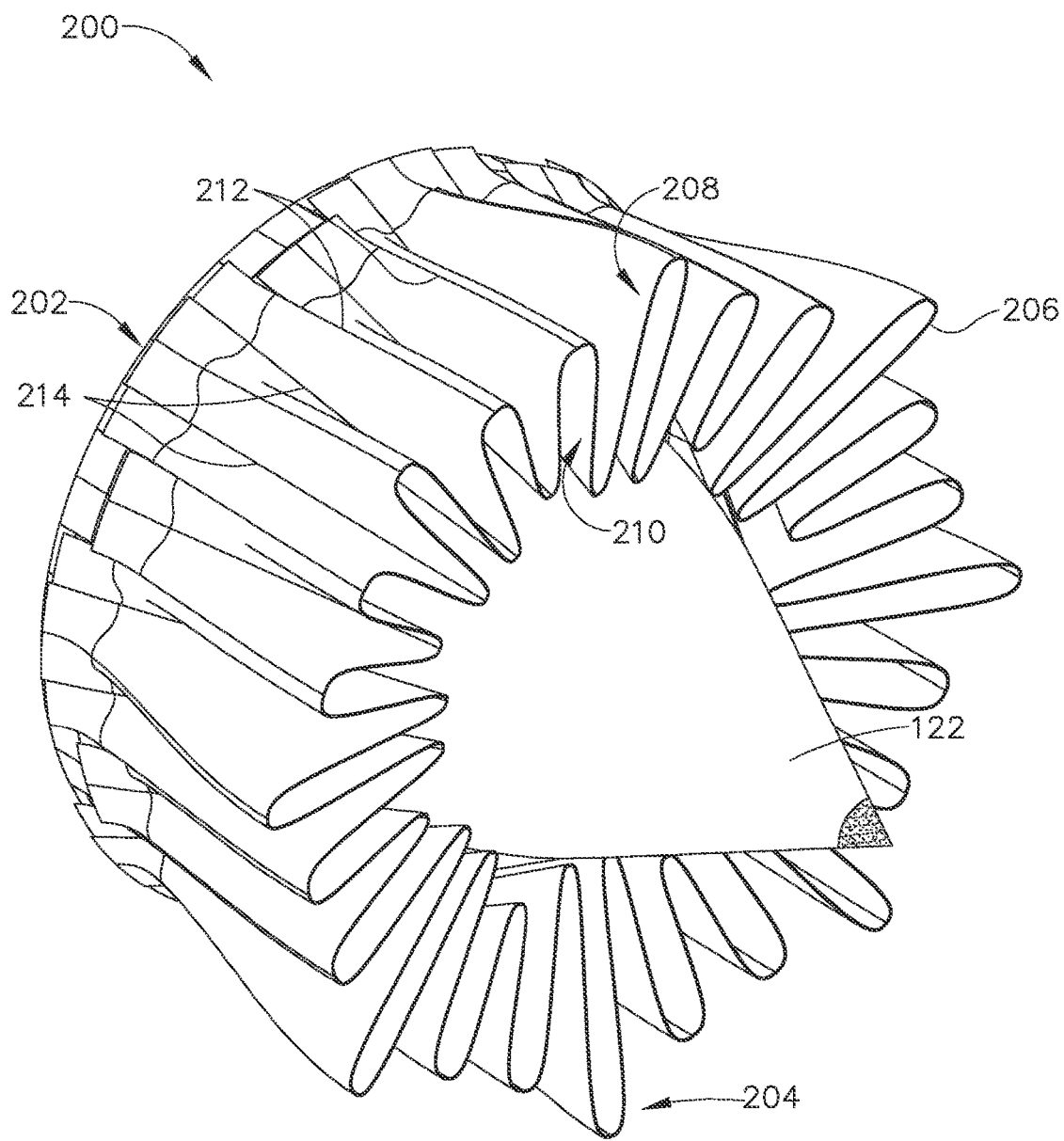
FIG. 6 is a perspective view of a third embodiment of a mixer for use on the gas turbine engine shown in FIG. 1.
Figure 7:
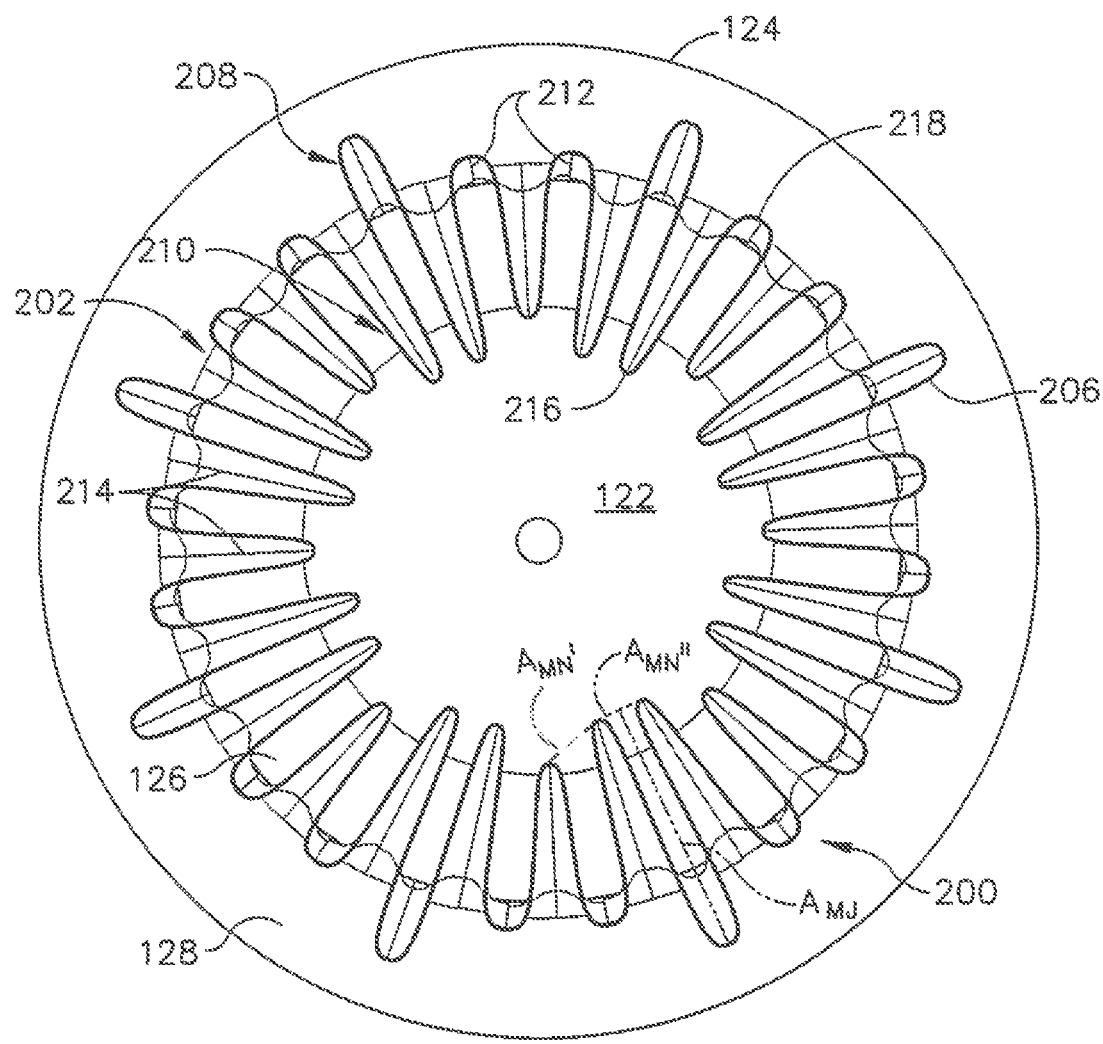
FIG. 7 is a back elevation view of the mixer shown in FIG. 6.

In this manner, a lobed mixer may be configured for optimal immersion that better balances mixing effectiveness with mixing pressure losses for optimal performance (e.g., optimal placement of the vortices shed by the trailing edge of the mixer can be accomplished and radial location of the vortex structures can be controlled). One example of such design would be an alternating lobe pattern (as shown in FIGS. 2 and 3) where every other lobe would have a higher bypass immersion and the intermediate lobes would have a lower bypass immersion that would present smaller blockages to the bypass flow, thereby minimizing pressure losses to the system. In addition, shed vortices from the lower immersion lobes are located more radially inward, enhancing mixing in the core flow region (i.e., the inner radial region) of the tailpipe. Thus, the net thrust increase (or SFC improvement) for the exhaust system is improved. Additionally, the above-described embodiments facilitate varying immersion patterns amongst mixers while maintaining substantially the same physical flow area. For example, a lower immersion lobe is sized to be wider in the circumferential location in order to maintain the same physical flow area as a higher immersion lobe, thereby seamlessly blending lobes of varying immersion.

Moreover, the above-described embodiments provide for more uniform mixing of bypass (cold) and core (hot) flow streams without sacrificing the overall level and magnitude of the mixing. Because the attenuation of high frequency jet noise due to exhaust gases is generally proportional to the level of mixing before bypass and core streams expand to the ambient at the exit of the tailpipe, a source of high frequency noise can be associated with the shearing interaction between the two unmixed flow streams. In that regard, the above-described mixer enhances local and overall mixing of bypass and core flows to reduce the shearing interaction between the two streams, thereby better attenuating the associated jet noise. While the above-described embodiments of the mixer may be particularly useful in a bypass gas turbine engine having a long duct mixed flow (LDMF) exhaust system, it should be noted that the above-described embodiments may also be useful in other suitable gas turbine engine configurations as well.

Exemplary embodiments of a mixer and a method of fabricating the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only exhaust systems of gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method of fabricating a mixer for a gas turbine engine having a core system for directing a core flow of gas through the gas turbine engine, and a bypass duct external to the core system for directing a bypass flow of gas through the gas turbine engine, said method comprising:

forming a forward end and an aft end of the mixer; and forming the aft end of the mixer to have a trailing edge which defines an annularly undulating contour that defines a plurality of core immersion lobes and a plurality of bypass immersion lobes between the forward end and the aft end of the mixer, wherein the plurality of bypass immersion lobes includes a first bypass immersion lobe, a second bypass immersion lobe, and a third bypass immersion lobe, the first bypass immersion lobe having a first crown contour line extending from the forward end to the aft end of the mixer, the second bypass immersion lobe having a second crown contour line extending from the forward end to the aft end of the mixer, wherein the first crown contour line is different than the second crown contour line, and wherein the first bypass immersion lobe extends radially farther into the bypass duct than the second bypass immersion lobe, and wherein the third bypass immersion lobe extends into the bypass duct a different radial distance than the respective distances to which the first bypass immersion lobe and the second bypass immersion lobe extend.

2. The method of claim 1, further comprising forming the first crown contour line to have a different curvature than the second crown contour line.

3. The method of claim 1, further comprising:

forming the first bypass immersion lobe and the second bypass immersion lobe to be generally semi-elliptically shaped, the first bypass immersion lobe having a first semi-major axis at the trailing edge, the second bypass immersion lobe having a second semi-major axis at the trailing edge, wherein the first semi-major axis is longer than the second semi-major axis.

4. The method of claim 1, further comprising forming the mixer from a ceramic matrix composite (CMC) material,
wherein the mixer comprises a plurality of first bypass immersion lobes,
wherein the mixer comprises a plurality of second bypass immersion lobes, and
wherein there are more second bypass immersion lobes than first bypass immersion lobes.

5. The method of claim 4, further comprising forming the trailing edge to be a scalloped trailing edge.

6. A mixer for a gas turbine engine having a core system for directing a core flow of gas through said gas turbine engine, and a bypass duct external to said core system for directing a bypass flow of gas through said gas turbine engine, said mixer comprising:
a forward end;
an aft end defining a trailing edge; and
the trailing edge defining an annularly undulating contour defining a plurality of core immersion lobes and a plurality of bypass immersion lobes between said forward end and said aft end of the mixer, wherein said plurality of bypass immersion lobes comprises a first bypass immersion lobe, a second bypass immersion lobe, and a third bypass immersion lobe, said first bypass immersion lobe having a first crown contour line extending from said forward end to said aft end of said mixer, said second bypass immersion lobe having a second crown contour line extending from said forward end to said aft end of said mixer, wherein said first crown contour line is different than said second crown contour line, and
wherein the first bypass immersion lobe extends radially farther into the bypass duct than the second bypass immersion lobe, and
wherein the third bypass immersion lobe extends into the bypass duct a different radial distance than the respective distances to which the first bypass immersion lobe and the second bypass immersion lobe extend.

7. The mixer of claim 6, wherein said first crown contour line has a different curvature than said second crown contour line.

8. The mixer of claim 6, wherein said first bypass immersion lobe and said second bypass immersion lobe are generally semi-elliptically shaped, said first bypass immersion lobe having a first semi-major axis at said trailing edge, said second bypass immersion lobe having a second semi-major axis at said trailing edge, wherein said first semi-major axis is different than said second semi-major axis.

9. The mixer of claim 6, wherein said mixer comprises a plurality of said first bypass immersion lobes and a plurality of said second bypass immersion lobes.

10. The mixer of claim 9, wherein each of said first bypass immersion lobes is disposed between a pair of adjacent second bypass immersion lobes.

11. The mixer of claim 6, wherein said trailing edge is a scalloped trailing edge.

12. A gas turbine engine comprising:
a core system comprising a compressor assembly, a combustion assembly aft of said compressor assembly, and a turbine assembly aft of said combustion assembly, wherein said compressor assembly, said combustion assembly, and said turbine assembly are arranged in flow communication along an axial dimension of said gas turbine engine;
a bypass duct extending along the axial dimension external to said core system;
a fan system forward of said compressor assembly and said bypass duct, said fan system configured to provide a core flow of gas into said core system and a bypass flow of gas into said bypass duct; and
an exhaust system aft of said core system and said bypass duct, said exhaust system comprising:
a tailpipe configured to receive the core flow of gas and the bypass flow of gas; and
a mixer coupled to said core system aft of said turbine assembly within said tailpipe to define a bypass flow region of said tailpipe and a core flow region of said tailpipe, said mixer comprising:
a forward end of said mixer;
an aft end of said mixer defining a trailing edge; and
the trailing edge defining an annularly undulating contour defining a plurality of core immersion lobes and a plurality of bypass immersion lobes between said forward end of said mixer and said aft end of said mixer, said core immersion lobes configured to deliver said bypass flow of gas into said core flow region of said tailpipe, said bypass immersion lobes configured to deliver said core flow of gas into bypass flow region of said tailpipe,
wherein said plurality of bypass immersion lobes comprises a first bypass immersion lobe, a second bypass immersion lobe, and a third bypass immersion lobe, said first bypass immersion lobe having a first crown contour line extending from said forward end of said mixer to said aft end of said mixer, said second bypass immersion lobe having a second crown contour line extending from said forward end to said aft end of said mixer, wherein said first crown contour line is different than said second crown contour line, and
wherein the first bypass immersion lobe extends farther in a radial direction into the bypass duct than the second bypass immersion lobe, and
wherein the third bypass immersion lobe extends into the bypass duct a different radial distance than the respective distances to which the first bypass immersion lobe and the second bypass immersion lobe extend.

13. The gas turbine engine of claim 12, wherein said first crown contour line has a different curvature than said second crown contour line.

14. The gas turbine engine of claim 12, wherein said first bypass immersion lobe and said second bypass immersion lobe are generally semi-elliptically shaped, said first bypass immersion lobe having a first semi-major axis at said trailing edge, said second bypass immersion lobe having a second semi-major axis at said trailing edge, wherein said first semi-major axis is different than said second semi-major axis.

15. The gas turbine engine of claim 12, wherein said mixer comprises a plurality of said first bypass immersion lobes and a plurality of said second bypass immersion lobes.

16. The gas turbine engine of claim 15, wherein each of said first bypass immersion lobes is disposed between a pair of adjacent second bypass immersion lobes.

17. The gas turbine engine of claim 12, wherein said trailing edge is a scalloped trailing edge, and wherein said plurality of bypass immersion lobes comprises one or more bypass immersion lobes that are scarfed, said scarfed one or more bypass immersion lobes being trimmed at an oblique angle relative to an axial dimension.

\* \* \* \* \*